United States Patent Office 2,812,086
Patented Nov. 5, 1957

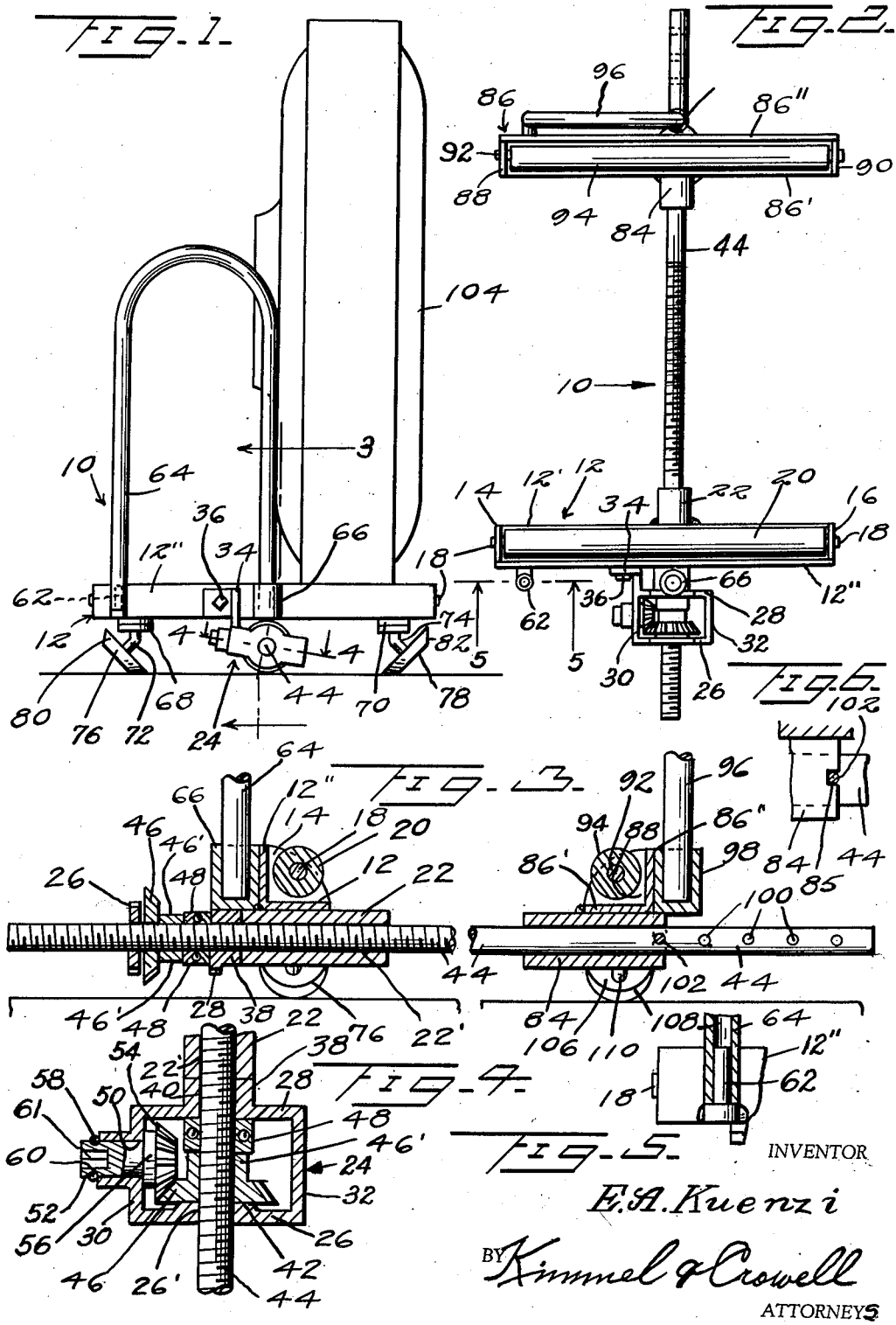

2,812,086

WHEEL DOLLY FOR TRUCKS AND BUSES

Eugene A. Kuenzi, Salem, Oreg.

Application August 23, 1954, Serial No. 451,543

1 Claim. (Cl. 214—333)

This invention relates to a manually operated wheel supported vehicle especially adapted for use in removing the wheels of trucks, buses, and other similar automotive vehicles.

More specifically, the present invention has, as one of its primary objects, the provision of a wheeled vehicle especially designed to support and to lift the weight off the axles of single or dual wheeled trucks, buses, and similar vehicles, during the removal thereof from the normally connected axles.

A further object of this invention is to provide a device of the type described which eliminates to a high degree accidental physical injuries due to pulling, tugging, and frequently occurring back injuries.

Another object of this invention is to provide a wheel dolly which is inexpensive to manufacture, non-complex in construction and assembly, and which is durable in use.

Other and further objects and advantages of the instant invention will become more apparent from a consideration of the following specification when read in conjunction with the appended drawing, in which:

Figure 1 is an end elevation of a wheel dolly constructed in accordance with the teachings of this invention, and illustrating the same as supporting a vehicle wheel.

Figure 2 is a top plan view of the wheel dolly shown in Figure 1.

Figure 3 is an enlarged detail cross-sectional view taken on the line 3—3 of Figure 1, looking in the direction of the arrows.

Figure 4 is an enlarged detail cross-sectional view taken on the horizontal plane of line 4—4 of Figure 1, looking in the direction of the arrows.

Figure 5 is an enlarged detail cross-sectional view taken on the horizontal plane of line 5—5 of Figure 2, looking in the direction of the arrows.

Figure 6 is an enlarged side elevation of the adjustable locking means shown in Figure 3.

Referring now more specifically to the drawings, reference numeral 10 designates, in general, a tire dolly constructed in accordance with the teachings of this invention. As seen in the drawing, the forward end of the dolly 10 comprises an L-shaped metallic channel member 12 having segmental inserts 14, 16 rigidly secured at its respective ends as by welding, though if desired the inserts may be cast integrally therewith. The inserts 14, 16 are adapted to receive and rotatably support the opposite ends of a shaft 18 having a roller 20 mounted thereon.

An elongated, substantially hollow and cylindrical housing 22 is rigidly secured to the underside of the horizontal arm 12' of the L-shaped element 12 centrally of its ends and extends perpendicularly with respect to the longitudinal axis thereof.

A substantially rectangular gear box 24 having an integrally formed opposed pair of spaced substantially parallel front and rear sides, 26 and 28, respectively, and a pair of spaced substantially parallel ends, 30 and 32, respectively, is subtended from an integrally formed bracket 34, below the horizontal arm 12' and in confrontation with the forward end of the housing 22, which is secured to the vertical arm 12" by a bolt 36.

The rear wall 28 is provided with an outwardly projecting cylindrical boss 38 which is juxtaposed with respect to the forward end of the hollow cylindrical housing 22. The rear wall 28 and the boss 38 are formed with a passageway 40 which is aligned with the passageway 22' formed in the housing 22 and with an opening 26' formed in the front wall 26 and which extends through the inwardly positioned flat circular boss 42.

A threaded shaft 44 extends forwardly through the passageways 22' and 40, and through the opening 26'. As seen in Figures 3 and 4, an internally threaded bevel gear 46 is threaded on the shaft 44 and is disposed within the gear box 24 with its front face engaging against the adjacent face of the boss 42 and the outer end of its hub 46' engages against a thrust bearing 48 mounted on the shaft 44 in the gear box 24 intermediate the gear 46 and the rear wall or side 28.

The end wall 30 of the gear box 24 is apertured at 50 to receive therethrough the cylindrical shank 52 of a bevel gear 54 disposed in the gear box 24 and meshing with the gear 46. Endwise displacement of the bevel gear 54 is prevented by the collar 56 mounted on the shank 52 exteriorly of the gear box 24 which is retained in place by a split ring 58 positioned in a circumferential groove 60 formed in the shank 52. The outer end of the shank 52 is formed with a polygonal pocket 61 adapted to receive one end of a manually operated crank (not shown).

A stud 62 is secured in upright position adjacent one side of the normally vertical arm 12" in spaced relationship relative thereto and receives thereover one end of a substantially hollow tubular handle member 64 having an inverted U-shaped configuration. The other end of the handle 64 enters a socket 66 rigidly secured to the arm 12" centrally thereof.

Caster mountings 68, 70 are affixed to the under side of the arm 12' adjacent each end thereof and each receives one end of an angular shaft, 72 and 74, respectively, the other ends of which carry casters 76, 78 having angularly inclined tread surfaces 80, 82.

The other end of the shaft 44 extends rearwardly through an elongated substantially hollow cylindrical housing 84 which has a pair of diametrically opposed slots 85 formed in its terminal or outermost end.

The housing 84 is rigidly secured to the under side of a normally horizontal arm 86' of a second L-shaped angle member 86 also having a vertical arm 86". Segmental sections 88 and 90 are set in and rigidly secured to each end of the angle member 86. Each segmental section is apertured to rotatably receive and support the opposite ends of a shaft 92 having a roller 94 mounted thereon.

As in the case of the first described L-shaped member 12, a vertically extending stud (not shown) is secured to the outer side of the arm 86" in spaced relationship relative thereto and receives thereover one end of an inverted U-shaped handle member 96 having its other end disposed within a socket 98 fixedly secured to the arm 86" centrally of its ends.

As is best seen in Figures 3 and 6, the shaft 44, adjacent the rear end thereof, is formed with a plurality of longitudinally spaced and diametrically extending passages 100 which are adapted to selectively receive a detachable pin 102 which projects on each side of the selected passage 100 for engagement with the oppositely disposed slots formed in the end of the casing 84, whereby the shaft 44 is retained against rotation.

A coaster 106 is secured to the underside of and adjacent each end of the arm 86' (only one coaster being illustrated), the coasters 106 having inclined treads 108 and being mounted on the lower ends of angular shafts 110.

In common practice, heavy wheels are removed from vehicles in one of several ways. Frequently grease is applied to the floor or to a piece of sheet metal, which is placed beneath the wheels to be removed and after the vehicle has been supported with a jack, the greased surface facilitates the removal of the wheel, but with the result that the greased surface offers a hazard to workmen.

Through the use of this invention, wheels can be easily removed without greasing the floor, using a greased piece of sheet metal, or through any other similar hazardous means; but simply the vehicle is jacked so that the wheel to be removed barely clears the floor. Then the invention is rolled into position beneath the wheels with the rollers 94 touching the tire. This adjustment is accomplished by adjusting the location of the pin which passes through the screw shaft or by rotating the gear mechanism which causes a portion of the machine to travel along the screw shaft. When the machine is in position, then by the simple rotation of the gear mechanism with a standard wrench handle, the weight of the tire and wheel is taken off the axle of the vehicle and the wheels are thus readily removed.

If the device is used to remove a single wheel, the uprights 64 are left in position to prevent the tipping of the wheel. However, if the device is used to remove dual wheels, the uprights 64 are first removed and the pin which passes through the screw shaft is also removed. The vehicle is jacked to a point so that the wheels to be removed clear the floor. The device is disassembled by removing the screw shaft 44 from the housing 84. The screw shaft is then passed between the dual wheels and returned to its position in housing 84. The pin is then inserted in the shaft at a point where the rollers 94 touch the tires, and the wheels are then lifted by means of the gear mechanism until the weight of the wheels no longer rests on the axle of the vehicle.

Again, the principal object of the screw gear mechanism is to lift the wheels and to take the weight off the axle.

Having described and illustrated one embodiment of this invention in detail, it is to be understood that the same is offered merely by way of example, and that the invention is to be limited only by the scope of the appended claim.

What is claimed is:

A dolly for vehicle wheels comprising a pair of elongated spaced apart parallel L-shaped members, a segmental member secured to each end of each of said L-shaped members perpendicularly thereto, a roller mounted on each of said L-shaped members with its opposite ends journalled in said segmental member, a caster wheel mounted in supporting relation to said L-shaped members under each end thereof, a transverse sleeve secured beneath each of said L-shaped members intermediate the opposite ends thereof, said sleeves having their axes aligned and extending perpendicularly to said L-shaped members, an elongated shaft slidably mounted in said sleeves, said shaft having a plurality of transverse spaced bores arranged adjacent one end and having external threads formed thereon adjacent the opposite end, a pin detachably engaged in a selected one of said transverse bores for engagement against the end of one sleeve opposite the other sleeve, an adjustment nut threaded on the threaded end of said shaft, means coupling said nut to the end of the other sleeve opposite said one sleeve, means supported by said coupling means for rotating said nut to move said L-shaped members together, and a detachable combined tire support and handle member secured to each of said L-shaped members in upright relation thereto.

References Cited in the file of this patent

UNITED STATES PATENTS

| 1,275,716 | Maurer, Jr. | Aug. 13, 1918 |
| 2,380,415 | Carruthers | July 31, 1945 |
| 2,392,409 | Ray | Jan. 8, 1946 |
| 2,491,034 | Couch | Dec. 13, 1949 |